United States Patent
Schweng

(10) Patent No.: US 7,453,502 B2
(45) Date of Patent: Nov. 18, 2008

(54) LENS SHADING ALGORITHM

(75) Inventor: Detlef Schweng, Weinstadt-Schnait (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 878 days.

(21) Appl. No.: 10/796,385

(22) Filed: Mar. 9, 2004

(65) Prior Publication Data

US 2005/0179793 A1 Aug. 18, 2005

(30) Foreign Application Priority Data

Feb. 13, 2004 (EP) .................................. 04392001

(51) Int. Cl.
*H04N 5/217* (2006.01)
*H04N 9/64* (2006.01)
(52) U.S. Cl. ...................................... 348/241; 348/251
(58) Field of Classification Search ................. 348/251, 348/241, 222.1; 356/3.01, 3.03, 3.06
See application file for complete search history.

(56) References Cited

U.S. PATENT DOCUMENTS

| | | | |
|---|---|---|---|
| 6,323,934 B1 | 11/2001 | Enomoto | 355/40 |
| 6,388,706 B1 | 5/2002 | Takizawa et al. | 348/273 |
| 6,833,862 B1 * | 12/2004 | Li | 348/207.99 |
| 2002/0039139 A1 | 4/2002 | Hsu et al. | 348/222 |

FOREIGN PATENT DOCUMENTS

| | | |
|---|---|---|
| EP | 0 562657 A | 9/1993 |
| EP | 1 134967 A | 9/2001 |

OTHER PUBLICATIONS

Co-pending U.S. Appl. No. 10/379,863, filed Mar. 4, 2003, Assigned to the Same Assignee, "Vignetting Compensation".

* cited by examiner

*Primary Examiner*—Yogesh Aggarwal
(74) *Attorney, Agent, or Firm*—Saile Ackerman LLC; Stephen B. Ackerman

(57) ABSTRACT

A method used for the compensation of vignetting in digital cameras has been achieved. The compensation for vignetting is performed by multiplying pixel output of the sensor array with a correction factor. In a preferred embodiment of the invention all pixels are multiplied with an adequate correction factor. Alternatively pixels, being close to the center of the sensor array, can be left unchanged. Said correction factor can be calculated in a very fast and efficient way by using two constant factors describing the specific geometry of the lens/sensor array system and by multiplying a first of said factors with the square of the distance between a pixel and the center of the sensor array and by multiplying a second of said factors with the distance between a pixel and the center of the sensor array to the power of four. The result of the second multiplication is subtracted from the result of the first multiplication and this result is added to one to get the final correction factor. Each original pixel output is multiplied with said correction factor to get output data compensated for the vignetting effects of the lens.

18 Claims, 3 Drawing Sheets

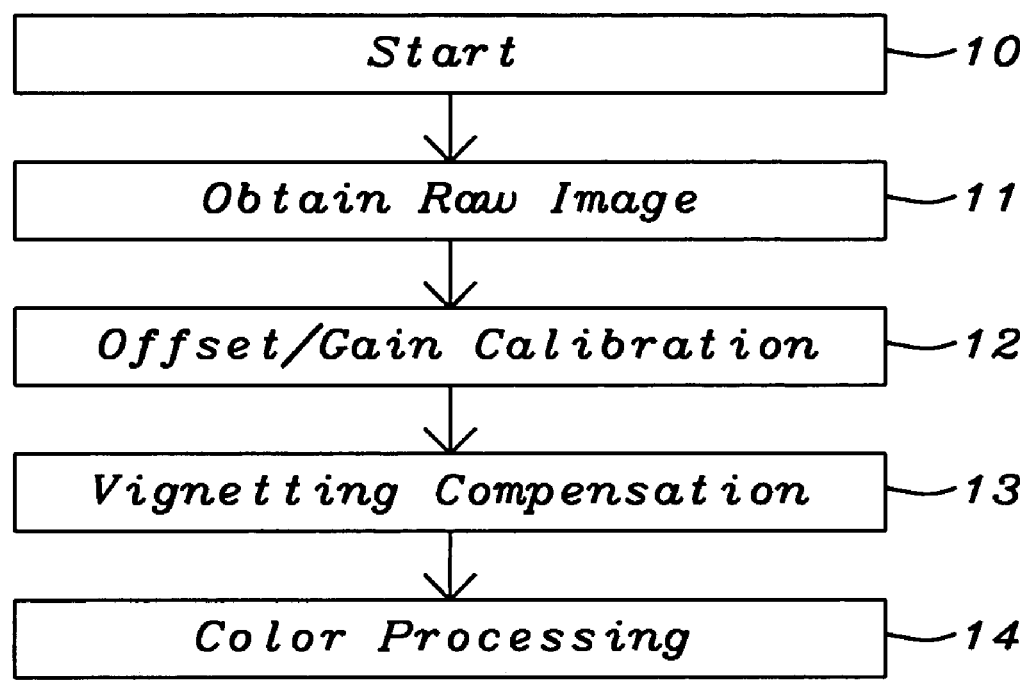
FIG. 1 - Prior Art

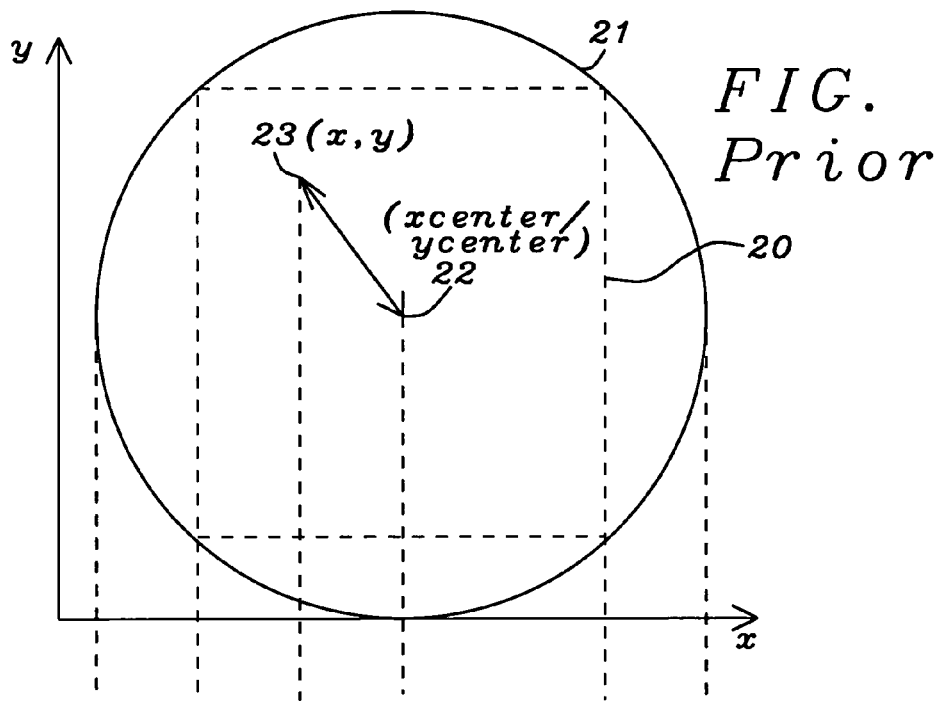
FIG. 2a – Prior Art
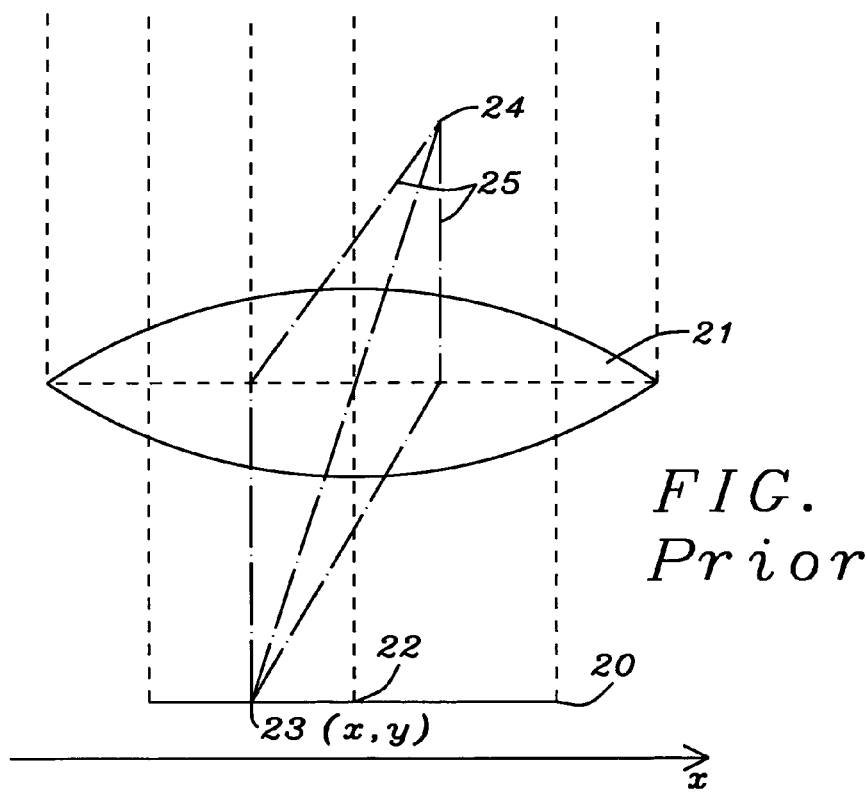
FIG. 2b – Prior Art

LENS SHADING ALGORITHM

RELATED PATENT APPLICATION

This application is related to U.S. patent application Ser. No. 10/379,863, filed on Mar. 4, 2003, and assigned to the same assignee as the present invention.

BACKGROUND OF THE INVENTION (1) Field of the Invention

This invention relates generally to image processing and relates more particularly to a method and an algorithm to compensate lens shading or vignetting in digital images.

(2) Description of the Prior Art

Photographically, vignetting means the darkening of the corners relative to the centre of an image. All camera lenses suffer, more or less, of these optical phenomena.

FIG. 1 prior art describes some major steps performed in image processing. In the first step 10 a raw image is obtained. In the next step 11 the offset/gain calibration is performed, followed by the compensation for vignetting 12. The last step 13 is the color processing.

A simple lens obeys an optical law called the "cos-$4^{th}$ law" (cosine of the angle of incidence off the lens axis to the $4^{th}$ power. The cos-$4^{th}$ influence comes from a number of factors, including that the light gets spread out over a larger area, and that the corners of the image are further away from the center of the lens than the on-axis part of the image. This means that for a lens with an angle of view of 20 degrees, where the maximum off-axis angle of incidence is 10 degrees, the corners receive cos (10 degrees) to the $4^{th}$ power as much light as the center. Cos (10 degrees) is 0.9848, so to the $4^{th}$ power is 0.9406. Therefore the corners get 94 percent as much light as the center, a generally imperceptible difference. A 20-degree angle of view for a 35 mm camera equates to a 123 mm lens. For a 28 mm lens, with a 75-degree angle of view, cos 4th comes to 0.39. So now the corners only get 39 percent of the light that the center gets. For a 20 mm lens this goes down to 21 percent, and for a 15 mm lens this goes down to 10.5 percent. Obviously the last case is unworkable and is not acceptable.

In order to solve said problems with lens shading, cameras are using typically complex optical systems, which are very expensive to manufacture. It is a challenge for the designers of digital cameras to design a camera having very low vignetting using less expensive lenses.

A compensation of lens shading is performed using a correction factor, which is dependent upon the distance of the pixel from the center of the lens. FIG. 2a prior art shows a top view of a lens/sensor system comprising a lens 21 and a sensor 20. The center 22 of the lens 20, which is also the center of the sensor, has the coordinates $X_{center}$, $Y_{center}$. A pixel 23 of the sensor 20 has the coordinates x, y. FIG. 2b prior art shows a side view of said lens/sensor system comprising said lens 21 and sensor 20. Light ray traces 25 emanating from an object 24 are reunited at the pixel 23 of the sensor.

The distance of the pixel 23 having the coordinates x, y from the center 22, having the coordinates $X_{center}$, $Y_{center}$, can be calculated using the equation:

$$dist = \sqrt{(x - x_{center})^2 - (y - y_{center})^2}. \tag{1}$$

An algorithm to compensate lens shading is $$pixel_{new} = pixel_{old} \times f_{corr},$$

wherein the prior art correction factor $f_{corr}$ is calculated using the equation $$f_{corr} = 1 + f_c \times \left(1 - \cos\left(\frac{dist}{d_f}\right)^4\right), \tag{2}$$

wherein the distance dist has been calculated using equation (1) above and the constant factors fc and df are dependent upon the geometry of the sensor system and the lens used. It is obvious that the correction factor according to equation (2) is difficult to calculate and algorithms, which are easier to be calculated, are very desirable.

The U.S. patent application Ser. No. 10/379,863, filed on Mar. 4, 2003, and assigned to the same assignee as the present invention describes a different method to compensate lens shading or vignetting in digital cameras. The compensation for vignetting is done in two steps. The first step is done during production of the camera unit and involves taking and analyzing an image of a test screen, preferably a gray test screen. This results in a set of e.g. 5×5 coefficients describing a polynomial surface. The second step is done for each image that is taken by the camera and involves calculating and applying a gain-table based on polynomial coefficients to all pixels of the image to compensate vignetting.

Other solutions dealing with the suppression of lens shading are described in the following patents:

U.S. Pat. No. (6,388,706 to Takizawa et al.) describes an image processing method for an electronic camera which includes a photoelectric element having plural sensors and color filters in plural different colors, wherein each of the plural sensors corresponds to a respective one of the color filters in the different colors. The method includes the steps of: obtaining a signal value from a target sensor; obtaining the first average value from signal values of the sensors; obtaining the second average value from signal values of the sensors and obtaining an interpolation value for a color, which is different from that of the color filter of the target sensor, of the target sensor according to the signal value from the target sensor, the first average value and the second average value. The vignetting of a lens causes a decrease in marginal brightness of an image field. However, if the correction for the decrease in marginal brightness is performed at the same time of performing white balance adjustment or/and gain adjustment, the correction for the marginal brightness may be performed upon decreasing the calculation volume.

U.S. Pat. No. (6,323,934 to Enomoto) discloses an image processing method in which at least one aberration of an optically recorded image selected from among lateral chromatic aberration, distortion, decrease on the brightness of the edge of image field and image blurring is corrected based on lens characteristics of a taking lens and position information of the image. Additionally, an image processing apparatus comprises an acquiring section for acquiring information identifying a taking lens; a storage section for storing lens characteristics associated with the type of the taking lens; and a correction section which receives the corresponding lens characteristics of the taking lens from the storage section and corrects at least one aberration selected from among lateral chromatic aberration, distortion, vignetting and image blurring. High-quality images that are free from color mismatch, distortion, uneven brightness, blurring and other defects, or both vignetting and distortion can be outputted consistently.

SUMMARY OF THE INVENTION

A principal object of the present invention is to achieve a fast and efficient way to calculate correction values to compensate vignetting in digital cameras.

In accordance with the object of this invention a method to compensate vignetting in digital cameras has been achieved. Said method comprises a multiplication of each pixel output of the array sensor of the camera with a variable correction factor defined for each pixel, wherein said variable correction factor depends upon the distance between each pixel and the center of said sensor array.

Also in accordance with the object of this invention a method to compensate vignetting in digital cameras has been achieved. Said method comprises a multiplication of each pixel output of the array sensor of the camera, except pixels being close to the center, with a variable correction factor defined for said pixels, wherein said variable correction factor depends upon the distance between said pixels and the center of said sensor array.

Also in accordance with the objects of this invention a method to compensate vignetting in digital cameras has been achieved. Said method is using a correction factor for pixel output of its sensor array wherein the required computation comprises the following steps, first, to provide x, y coordinates for the pixels of the sensor array, to assign a first constant factor, describing the geometry of the lens/sensor system to a first variable f1, to assign a second constant factor, describing the geometry of the lens/sensor system to a second variable f2, to calculate the distance in x-direction between the location of a pixel and the center of the sensor array and assign it to a variable xdist to calculate the distance in y-direction between the location of a pixel and the center of the sensor array and assign it to a variable ydist. Furthermore the next steps describe to calculate the square of the total distance between the location of a pixel and the center of the sensor array and assign it to a variable dist2, to calculate the total distance between the location of a pixel and the center of the sensor array to the power of four and assign it to a variable dist4, to calculate a correction factor and assign to the variable fcorr according to the equation fcorr=1+f1×dist2−f2×dist4, and to multiply said correction factor with the old pixel value to get a compensated pixel value.

Furthermore in accordance with the objects of this invention a method to compensate vignetting in digital cameras has been achieved. Said method is using a correction factor for pixel output of its sensor array wherein the required computation comprises the following steps, first, to provide polar coordinates r and θ for the pixels of the sensor array, wherein the center of the sensor array is the origin of said polar coordinates, to assign a first constant factor, describing the geometry of the lens/sensor system to a first variable f1, and to assign a second constant factor, describing the geometry of the lens/sensor system to a second variable f2. The next steps comprise to calculate the square of the coordinate r of a pixel and assign it to a variable dist2, to calculate the coordinate r of a pixel to the fourth power and assign it to a variable dist4, to calculate a correction factor and assign to the variable fcorr according to the equation fcorr=1+f1×dist2−f2×dist4, and to multiply said correction factor with the old pixel value to get a compensated pixel value.

BRIEF DESCRIPTION OF THE DRAWINGS

In the accompanying drawings forming a material part of this description, there is shown:

FIG. 1 prior art shows a flowchart of the various steps performed to process images in a digital camera.

FIG. 2a prior art shows a principal top view of a lens/sensor system

FIG. 2b prior art shows a principal side view of a lens/sensor system

DESCRIPTION OF THE PREFERRED EMBODIMENTS

Figure 3:
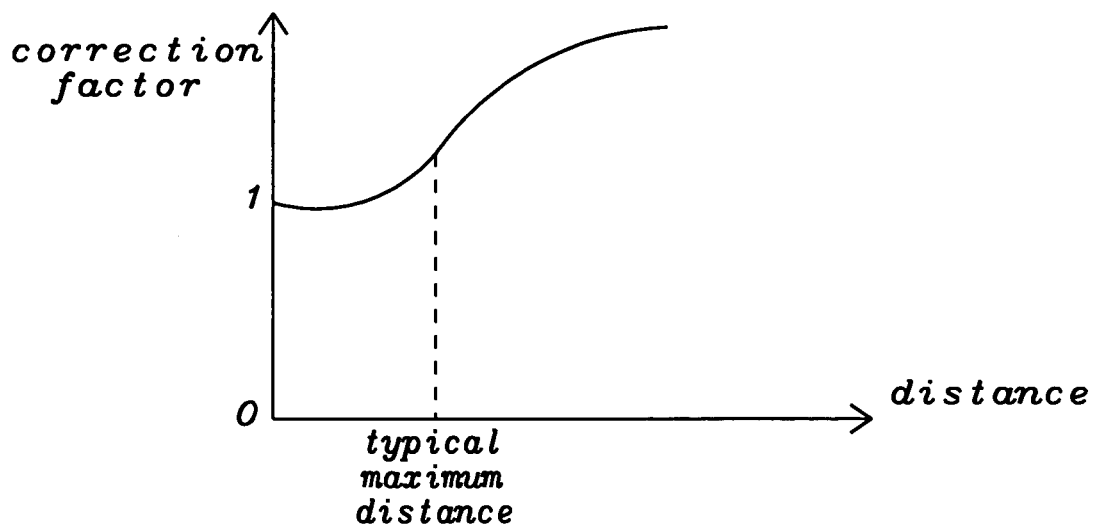
FIG. 3 shows a graph describing principally how the correction factor $f_{corr}$ depends upon the distance from the center of a sensor array.

The preferred embodiments disclose a novel algorithm and a method to compute a correction factor to compensate lens shading or vignetting of digital cameras allowing the usage of a cheaper lens and still producing a high image quality in respect of vignetting. Said algorithm of the present invention can be can computed in a very fast and efficient way and consumes less power and time for tits computation. A correction factor is calculated for each pixel of the sensor used.

At first for each pixel the square dist2 of its distance from the center of the image array (as shown in FIGS. 2a and 2b prior art) has to be calculated:

$$dist2(x,y) = (x - x_{center})^2 + (y - y_{center})^2, \quad (3)$$

wherein X and y are the coordinates of a pixel and $X_{center}$ and $Y_{center}$ are the coordinates of the center of an image array corresponding to the center of the lens used. The next step ids the calculation of the square dist4 of this squared distance dist2 has to be calculated:

$$dist4(x,y) = (dist2)^2. \quad (4)$$

Both coefficients are used now to calculate a correction factor to compensate vignetting according to the following equation:

$$f_{corr}(x,y) = 1 + f_1 \times dist2 - f_2 \times dist4 \quad (5)$$

wherein fcorr(x,y) is a correction factor applied to each pixel of the image sensor array, f1 is a constant dependent upon the geometry and quality of the lens/sensor system, and f2 is another constant dependent upon the geometry and quality of the lens/sensor system. The size of the lens, the size of the active sensor area, the distance between lens and sensor, the focal length, the thickness of the lens (depending on the material), and the quality of the lens are factors influencing said constants $f_1$ and $f_2$.

Finally the correction factor $f_{corr}(x,y)$ is applied to the pixel stream by multiplication:

$$pixel_{new}(x,y) = f_{corr}(x,y) \times pixel_{old}(x,y). \quad (6)$$

An alternative approach to define the distance between a pixel and the center of a sensor array is to use polar coordinates wherein the center of the sensor array would be the origin of the polar coordinates instead of x, y coordinates. The position of each pixel within a sensor array is known. Usually x and y coordinates are used to define the exact position of a pixel in a sensor array. Since the polar coordinates or positions are determined according to the distance or radius from an origin, symbolized by r and the angle relative to a reference axis, symbolized usually by Greek θ, the distance between a pixel and the center of the sensor array, being the origin of the polar coordinates in this case, is already known by knowing said coordinate r. The angle θ is not relevant in our case.

Another alternative approach is not to compensate pixels being very close to the center of the sensor array. Vignetting effects does not influence pixels having very little distance to the center of the sensor array. This area has to be very small; otherwise a step (a circle around the center) is visible when the compensation starts in a distance too far away from the center.

Lens shading is efficiently compensated using the compensation method of the present invention. FIG. 3 shows a graph describing principally how the correction factor $f_{corr}$ depends upon the distance from the center of a sensor array. The correction factor fcorr is greater than 1 and, within a usual range, rises faster the greater the distance is from the center of the sensor array. The fact, that the curve gets almost flat beyond a distance from the center of the sensor array greater than a maximum distance in typical sensor arrays is nor relevant.

Figure 4:
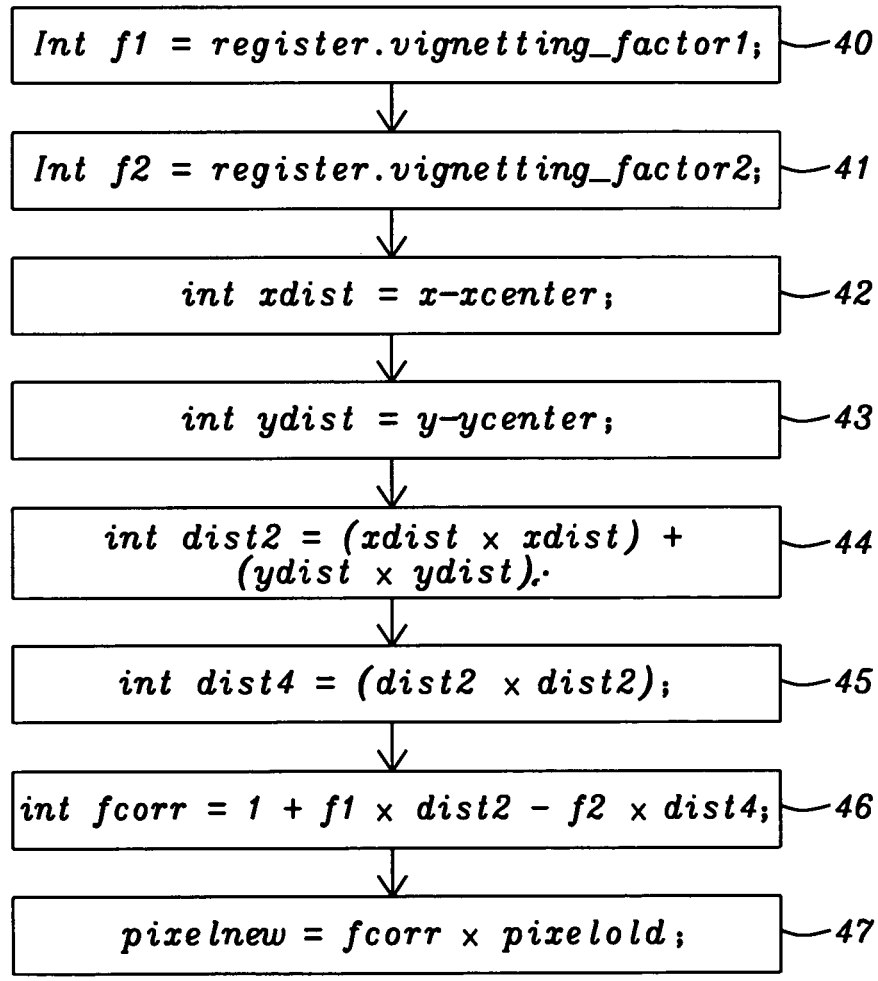
FIG. 4 shows a flowchart of a method to compute the compensation of vignetting.

The flowchart of FIG. 4 describes a preferred algorithm to compute corrected pixel data in order to compensate lens shading. In a preferred algorithm, with the exception of the last step 47, a computation in integer format has been used to minimize the computation time required. Floating point computation could be performed as well. In the first step 40 the constant factor $f_1$, used in equation (5), is loaded from a register. In the next step 41 the constant factor $f_2$, used in equation (5) also, is loaded from a register. In the following step 42 the horizontal distance xdist from the center of the sensor array of a current pixel is calculated, followed by step 43, wherein the vertical distance ydist from said center is computed. In the next step 44 the square dist2 of the distance of said current pixel to the center of the sensor array is computed according to equation (3), followed by step 45 wherein the square dist4 of the square distance, according to equation (4), is computed, According to equation (5) the correction factors $f_{corr}$ are computed in step 46 and, finally, in step 47, according to equation (6), each of the original pixel values are multiplied with the related correction factors $f_{corr}$ to get the vignetting effects of the lens compensated.

While the invention has been particularly shown and described with reference to the preferred embodiments thereof, it will be understood by those skilled in the art that various changes in form and details may be made without departing from the spirit and scope of the invention.

What is claimed is:

1. A method to compensate vignetting in digital cameras comprising a multiplication of each pixel output of the array sensor of the camera with a variable correction factor defined for each pixel, wherein said variable correction factor is calculated for each pixel using a first product of a first constant factor, describing the geometry and guality of the lens/sensor system, multiplied with the square of the distance between the pixel and the center of the sensor array, and a second product of a second constant, describing the geometry of the lens/sensor system with the distance between the pixel and the center of the sensor array to the power of four.

2. The method of claim 1 wherein said calculation of the correction factor for each pixel output is using the equation:

$$f_{corr}=1+f1 \times dist2 - f2 \times dist4,$$

wherein $f_{corr}$ is the correction factor to be multiplied with each pixel output of the sensor array, f1 is a constant describing the geometry of the lens/sensor system, dist2 is the square of the distance between a pixel and the center of the sensor array, f2 is a constant describing the geometry of the lens/sensor system, and dist4 is the distance between said pixel and the center of the sensor array to the power of four.

3. The method of claim 2 wherein x, y coordinates are being used to define the position of each pixel and said calculation of the correction factor for each pixel output is using the equation:

$$f_{corr}(x, y)=1+f1 \times dist2(x, y) - f2 \times dist4(x, y),$$

wherein $f_{corr}$ is the correction factor to be multiplied with each pixel output of the sensor array, f1 is a constant describing the geometry of the lens/sensor system, dist2 (x, y) is the square of the distance between a pixel, having the coordinates x, y, and the center of the sensor array, f2 is a constant describing the geometry of the lens/sensor system, and dist4 is the distance between said pixel, having the coordinates x, y and the center of the sensor array to the power of four.

4. The method of claim 2 wherein polar coordinates are being used, having the center of the sensor array as origin, to define the position of each pixel and said calculation of the correction factor for each pixel output is using the equation:

$$f_{corr}(r)=1+f1 \times r2 - f2 \times r4,$$

wherein $f_{corr}$ is the correction factor to be multiplied with each pixel output of the sensor array, f1 is a constant describing the geometry of the lens/sensor system, r2 is the first polar coordinate r of a pixel to the power of 2, f2 is a constant describing the geometry of the lens/sensor system, and r4 is the first polar coordinate r of a pixel to the power of four.

5. The method of claim 2 wherein said constant factors f1 and f2 depend upon the size of the lens, the size of the active sensor area, the distance between lens and sensor, the focal length, the thickness of the lens (depending on the material), and the quality of the lens.

6. A method to compensate vignetting in digital cameras comprising a multiplication of each pixel output of the array sensor of the camera, except pixels being close to the center, with a variable correction factor defined for said pixels, wherein said variable correction factor is calculated for each pixel, except pixels being close to the center of the sensor array, using a first product of a first constant factor, describing the geometry and quality of the lens/sensor system, multiplied with the square of the distance between the pixel and the center of the sensor array, and a second product of a second constant, describing the geometry of the lens/sensor system with the distance between the pixel and the center of the sensor array to the power of four.

7. The method of claim 6 wherein said calculation of the correction factor for each pixel output, except for pixels being close to the center of the sensor array, is using the equation:

$$f_{corr}=1+f1 \times dist2 - f2 \times dist4,$$

wherein $f_{corr}$ is the correction factor to be multiplied with each pixel output of the sensor array, f1 is a constant describing the geometry of the lens/sensor system, dist2 is the square of the distance between a pixel and the center of the sensor array, f2 is a constant describing the geometry of the lens/sensor system, and dist4 is the distance between said pixel and the center of the sensor array to the power of four.

8. The method of claim 7 wherein x, y coordinates are being used to define the position of each pixel and said calculation of the correction factor for each pixel output, except for pixels being close to the center of the sensor array, is using the equation:

$$f_{corr}(x,y)=1+f1 \times dist2(x,y) - f2 \times dist4(x,y),$$

wherein $f_{corr}$ is the correction factor to be multiplied with each pixel output, except pixels being close to the center of the sensor array, of the sensor array, f1 is a constant describing the geometry of the lens/sensor system, dist2 (x, y) is the square of the distance between a pixel, having the coordinates x, y, and the center of the sensor array, f2 is a constant describing the geometry of the lens/sensor system, and dist4 is the distance between said pixel, having the coordinates x, y and the center of the sensor array to the power of four.

9. The method of claim 7 wherein polar coordinates are being used, having the center of the sensor array as origin, to define the position of each pixel and said calculation of the correction factor for each pixel output, except for pixels being close to the center of the sensor array, is using the equation:

$$f_{corr}(r)=1+f1 \times r2 - f2 \times r4,$$

wherein $f_{corr}$ is the correction factor to be multiplied with each pixel output, except pixels being close to the center of the sensor array, of the sensor array, f1 is a constant describing the geometry of the lens/sensor system, r2 is the first polar coordinate r of a pixel to the power of 2, f2 is a constant describing the geometry of the lens/sensor system, and r4 is the first polar coordinate r of a pixel to the power of four.

10. The method of claim 7 wherein said constant factors f1 and f2 depend upon the size of the lens, the size of the active sensor area, the distance between lens and sensor, the focal length, the thickness of the lens (depending on the material), and the quality of the lens.

11. A method to compensate vignetting in digital cameras using a correction factor for pixel output of its sensor array wherein the required computation comprises the following steps:

providing x, y coordinates for the pixels of the sensor array;
assign a first constant factor, describing the geometry of the lens/sensor system to a first variable f1;
assign a second constant factor, describing the geometry of the lens/sensor system to a second variable f2;
calculate the distance in x-direction between the location of a pixel and the center of the sensor array and assign it to a variable xdist;
calculate the distance in y-direction between the location of a pixel and the center of the sensor array and assign it to a variable ydist;
calculate the square of the total distance between the location of a pixel and the center of the sensor array and assign it to a variable dist2;
calculate the total distance between the location of a pixel and the center of the sensor array to the power of four and assign it to a variable dist4;
calculate a correction factor and assign to the variable fcorr according to the equation $$fcorr=1+f1 \times dist2 - f2 \times dist4; \text{ and}$$

multiply said correction factor with the old pixel value to get a compensated pixel value.

12. The method of claim 11 wherein all computations with the exception of the multiplication with the correction factor are performed using in integer mode.

13. The method of claim 11 wherein said correction factor is applied to all pixels of the sensor array.

14. The method of claim 11 wherein said correction factor is applied to all pixels of the sensor array, except pixels being close to the center of the sensor array.

15. A method to compensate vignetting in digital cameras using a correction factor for pixel output of its sensor array wherein the required computation comprises the following steps:

providing polar coordinates r and θ for the pixels of the sensor array, wherein the center of the sensor array is the origin of said polar coordinates;
assign a first constant factor, describing the geometry of the lens/sensor system to a first variable f1;
assign a second constant factor, describing the geometry of the lens/sensor system to a second variable f2;
calculate the square of the coordinate r of a pixel and assign it to a variable dist2;
calculate the coordinate r of a pixel to the fourth power and assign it to a variable dist4;
calculate a correction factor and assign to the variable fcorr according to the equation $$fcorr=1+f1 \times dist2 - f2 \times dist4; \text{ and}$$

multiply said correction factor with the old pixel value to get a compensated pixel value.

16. The method of claim 15 wherein all computations with the exception of the multiplication with the correction factor are performed using in integer mode.

17. The method of claim 15 wherein said correction factor is applied to all pixels of the sensor array.

18. The method of claim 15 wherein said correction factor is applied to all pixels of the sensor array, except pixels being close to the center of the sensor array.

\* \* \* \* \*